United States Patent [19]

Moritani et al.

[11] 4,311,805
[45] Jan. 19, 1982

[54] VINYL ALCOHOL COPOLYMERS CONTAINING CATIONIC GROUPS

[75] Inventors: Tohei Moritani; Junnosuke Yamauchi; Makoto Shiraishi, all of Kurashiki, Japan

[73] Assignee: Kuraray Company, Limited, Kurashiki, Japan

[21] Appl. No.: 168,712

[22] Filed: Jul. 14, 1980

[30] Foreign Application Priority Data

Jul. 12, 1979 [JP] Japan .................................. 54-89078
Dec. 19, 1979 [JP] Japan ................................ 54-166238

[51] Int. Cl.$^3$ .............................................. C08F 8/12
[52] U.S. Cl. ................................ 525/60; 162/168 N; 260/29.6 B; 525/61; 525/62
[58] Field of Search ............................. 525/60, 62, 61

[56] References Cited

U.S. PATENT DOCUMENTS 3,345,346 10/1967 Reynolds .............................. 525/61
4,144,388 3/1979 Yatsu et al. ........................... 525/60

OTHER PUBLICATIONS

Japanese Pat. Pub. No. 401/1971, Murakami et al., abstract.
Japanese Pat. Pub. No. 38601/1971, Mori et al., abstract.
Kobunshi Kagaku, 8, 467 (1957), Okamura et al., abstract.
Kogyo Kagaku Zasshi, 59, 658 (1956), Akiyoshi et al., abstract.
Kogyo Kagaku Zasshi, 60, 353 and 1188 (1951), Furukawa et al., abstract.
Jap. Pat. Pub. No. 5563/1955, Suyama et al., abstract.
Jap. Pat. Pub. No. 3319/1956, Ohsugi et al., abstract.
Kobunshi Tembo, 15, 69 (1951), H. Suyama, abstract.
Jap. Pat. Pub. No. 23875/1978, Tsuji et al., abstract.
Kobunshi Ronbunshu, 34, No. 12, 843 (1977), Hosono et al., abstract.
J. App. Pol. Sci., 21, 2125 (1977), Tsuji et al.
Jap. Pat. App. Laid Open 38383/1976, Taniguchi et al., abstract.
Bulletin, Chem. Soc. of Japan, 47, 2990 (1974), Higuchi et al.
Nippon Kagaku Kaishi, 11, 1955 (1975), Muramoto et al., abstract.
Jap. Pat. Pub. 23382/1977, Kobayashi et al., abstract.
Jap. Pat. App. Laid Open 3689/1977, Nakamura et al., abstract.

Primary Examiner—Stanford M. Levin
Attorney, Agent, or Firm—Oblon, Fisher, Spivak, McClelland & Maier

[57] ABSTRACT

A water-soluble cationic copolymer and methods for producing the same is disclosed which comprises comonomer units respectively represented by the formulae:

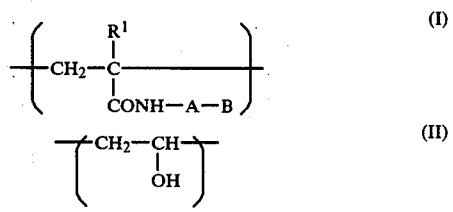

wherein $R^1$ is H or lower alkyl; B is

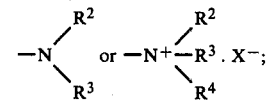

$R^2$, $R^3$ and $R^4$ are each independently lower alkyl or lower alkyl which contain a substituent; X is an anion capable of forming a salt with the ammonium nitrogen; and A is a group which links the nitrogen atom in B to the amide nitrogen atom.

These copolymers are used in preparing paper strength additives.

38 Claims, 6 Drawing Figures

VINYL ALCOHOL COPOLYMERS CONTAINING CATIONIC GROUPS

BACKGROUND OF THE INVENTION

1. Field of the Invention

This invention relates to cationic group-containing vinyl alcohol copolymers, methods of producing the same and paper strength additives comprising the same.

2. Description of the Prior Art

Polyvinyl alcohol (hereinafter PVA) is a typical water-soluble synthetic polymer and has been used widely for various industrial purposes, particularly as a raw material in the production of a synthetic fiber VINYLON and as a size. The film-forming properties and strength characteristics of PVA are especially taken advantage of in paper surface sizing and warp sizing. PVA is also expected to be effective as a paper strength additive, that is a size to be used internally in papermaking for the purpose of increasing the strength of paper. However, PVA has not yet been applied as such an agent. This is because PVA is one of the so-called nonionic polymers which essentially do not contain any ionic groups and therefore PVA, in substance, cannot be adsorbed by the pulp even if an aqueous solution of PVA is added to the pulp slurry. According to Japanese Patent Publication Nos. 401/1971 and 38601/1971, PVA has been modified by the introduction of anionic groups, such as carboxyl, and the modified PVA's are used as strength additives for paper by causing them to be adsorbed by the pulp with combined use of alum. Such a modified PVA has never been commercialized as an internal strength additive for paper, however, presumably because the anionic groups in the modified PVA from intramolecular ester bonds with the hydroxyl groups under acidic conditions created by the combined use of alum. Since the anionic groups cannot serve as effective active sites, the intended improvement in fixation of the additive by the pulp cannot be effected. Cationic groups, instead of anionic groups, are also capable of being fixed by the pulp and it is known that under such conditions it is unnecessary to use alum. Cationic group-modified starch and polyacrylamide have already been commercialized. One might expect by analogy that when cationic groups are introduced into PVA, adsorption by the pulp would become possible and the excellent strength characteristics of PVA could be utilized effectively. However, as will be discussed, the known methods of introducing cationic groups into PVA have many difficulties and at present there are no measures available which can be adopted on a commercial scale.

In one known method of obtaining a cationic PVA, a cationic monomer, vinylpyridine and vinyl acetate were copolymerized and then subjected to saponification to give a modified PVA containing 1.19 mole % of vinylpyridine units (Kobunshi Kagaku 8, 467 (1951)). As described in this report, the rate of polymerization in this copolymerization system is so slow that the production of the copolymer is far from economical. In Kogyo Kagaku Zasshi 59, 658 (1956) and ibid. 60, 353 and 1188 (1957), methods are disclosed comprising copolymerizing vinyl acetate and N-vinylphthalimide or N-vinylsuccinimide, then saponifying the vinyl acetate units and further decomposing the imide groups with an alkali or hydrazine. The imide groups of both the imide monomer units can be decomposed to amide groups but, as shown in the above-cited reports, it is difficult to make the degradation reaction proceed until cationic amino groups are formed.

Various methods of making PVA cationic by methods other than copolymerization have also been proposed. For instance, it is reported that an amino group-containing PVA can be synthesized through aminoacetalization, e.g., Japanese Patent Publication Nos. 5563/1955, 3319/1956 and 23875/1978, Kobunshi Tenbo 15, 69 (1951), Kobunshi Ronbun Shu 34, 843 (1977), Journal of Applied Polymer Science 21, 2125 (1977) or through aminobenzacetalization, e.g., Japanese Patent Application Laid Open No. 38383/1976. This kind of PVA shows cationic properties only under limited conditions, namely in acidic aqueous solutions. In U.S. Pat. No. 3,345,346, a method of producing an amino group-containing PVA by an ether exchange reaction is disclosed, which comprises reacting PVA with an alkoxydimethylamine in anhydrous dioxane. Another method comprises subjecting PVA to a Michael addition reaction of acrylamide and then subjecting the acrylamide units to Hoffman degradation to introduce amino groups (Bulletin of Chemical Society of Japan 47, 2990 (1974)). A report (Nippon Kagaku Kaishi 1975 (11), 1955) describes a modified PVA with a nitrogen content of 2.6 to 5.1%, which was synthesized by treating PVA with sulfuric acid, reacting the so-treated PVA with epichlorohydrin and further with a polyethylenepolyamine. The structure of the product is not fully clear, but the product is claimed to be effective as a coagulant. Japanese Patent Laid Open No. 3689/1977 discloses a method of producing a quaternary ammonium salt-containing cationic PVA which comprises reacting glycidyltrimethylammonium chloride with PVA in the presence of an alkali catalyst. A similar process is, in fact, in commercial use to make starch cationic, but PVA, although it is also a polymer having hydroxyl groups, is much less reactive than starch to glycidyltrimethylammonium chloride or to a ring opened product thereof, namely, 3-chloro-2-hydroxypropyltrimethylammonium chloride. Such a process has not yet been commercially utilized with PVA.

Of the above prior art techniques, the polymer modification methods of introducing cationic groups, although realizable in laboratories, have the following difficulties from the industrial point of view:

1. It is necessary to dissolve PVA prior to the reaction. It is often difficult to attain homogenous reactions when PVA is subjected to the reaction in a powder or slurry form.
2. It is difficult to obtain products with a certain constant degree of modification.
3. Crosslinking reactions frequently occur simultaneously, leading to insolubilization of the polymers.
4. Generally, the operational costs are high.

On the other hand, none of the methods involving copolymerization, as mentioned above, have been found effective in providing PVA with cationic properties.

Vinylbenzyltrimethylammonium chloride is one commercially available cationic monomer. This monomer, however, is substantially uncopolymerizable with vinyl esters. Other commercially available cationic monomers are aminoalkyl (meth)acrylates such as:

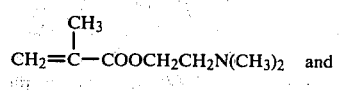

-continued

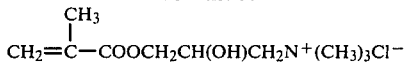

and are in wide use in producing cationic copolymers by copolymerization with a variety of monomers. These aminoalkyl (meth)acrylates are copolymerizable with vinyl esters, especially vinyl acetate. However, when the copolymer is saponified, the ester linkage in the aminoalkyl (meth)acrylate unit is also saponified simultaneously and therefore, it is difficult to effectively prepare the PVA containing cationic groups.

Heretofore, it has been difficult to produce modified polyvinyl alcohol having cationic properties on an industrial scale in an inexpensive manner. The prior art contains no effective means for doing so. A need, therefore, continues to exist for novel water soluble cationic copolymers containing PVA and for methods of preparing them.

SUMMARY OF THE INVENTION

Therefore, an object of the invention is to provide useful copolymers containing vinyl alcohol units and cationic groups.

Another object is to provide copolymers with cationic charges possessing the capability of being adsorbed on pulp and the like while making good use of the strength and film-forming properties of PVA.

A further object is to provide novel strength additives for paper.

A further object is to provide a method for preparing the above-described copolymers.

The polymers of the present invention are novel copolymers which contain as essential constituents thereof two comonomer units represented by the following general formulae (I) and (II) or three comonomer units represented by the general formulae (I), (II) and (III):

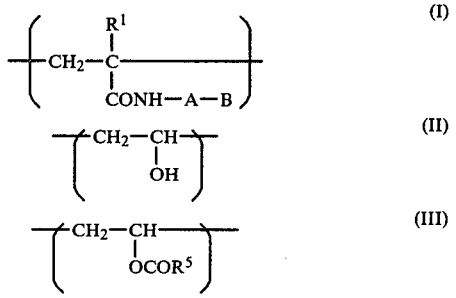

wherein $R^1$ and $R^5$ are each H or lower alkyl; B is

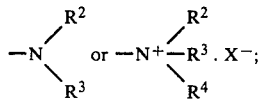

$R^2$, $R^3$ and $R^4$ are each independently lower alkyl which may contain a substituent; X is an anion group capable of forming a salt with the ammonium nitrogen; and A is a group which links the nitrogen atom in B to the nitrogen atom in the amide group. The copolymers are soluble in water and are cationic.

The copolymers can be produced by copolymerizing a vinyl ester and an acrylamide derivative and then saponifying at least partially the vinyl ester units to vinyl alcohol units by the addition of an alkali or acid catalyst. The vinyl ester units may also be completely saponified.

The copolymers, owing to the presence of cationic groups are highly capable of being adsorbed on pulp fibers. Moreover, the cationic groups have excellent characteristics as paper strength additives since they synergistically enhance the film-forming property and film strength of polyvinyl alcohol.

BRIEF DESCRIPTION OF THE DRAWINGS

A more complete appreciation of the invention and many of the attendant advantages thereof will be readily attained as the same becomes better understood by reference to the following detailed description when considered in connection with the accompanying drawings, wherein:

FIG. 1 is a spectrum for a copolymer of N-(3-dimethylaminopropyl)acrylamide and vinyl alcohol;

FIG. 2 for a quaternized product of the last-mentioned copolymer, namely, a copolymer of trimethyl-(3-acrylamidopropyl)ammonium chloride and vinyl alcohol;

FIG. 3 for a copolymer of trimethyl-(3-acrylamido-3,3-dimethylpropyl)ammonium chloride and vinyl alcohol;

FIG. 4 for a copolymer of N-(3-dimethylaminopropyl)methacrylamide and vinyl alcohol;

FIG. 5 for a copolymer of trimethyl-(3-methacrylamidopropyl)ammonium chloride and vinyl alcohol and FIG. 6 for a copolymer of trimethyl-(3-methacrylamidopropyl)ammonium chloride, vinyl alcohol, and vinyl acetate. In each figure, the abscissa indicates the chemical shift in ppm relative to an internal standard (sodium d-trimethylsilylpropionate) present in the test sample solution.

DETAILED DESCRIPTION OF THE PREFERRED EMBODIMENTS

Figure 1:
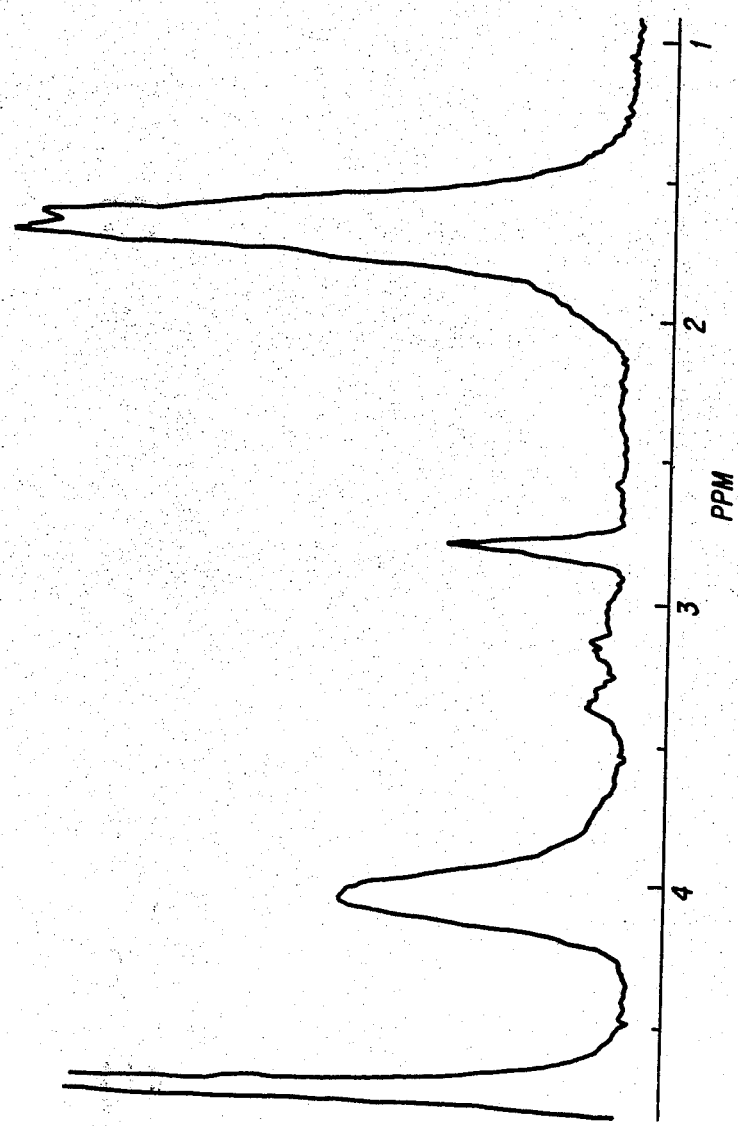
FIGS. 1-6 are proton nuclear magnetic resonance spectra as recorded on a VARIAN Model EM-390 at a main frequency of 90 MHz with a 5% heavy water solution of each copolymer prepared according to the present invention.

The copolymers provided by the present invention are novel compounds which may be produced by copolymerizing a vinyl ester and a polymerizable monomer represented by the formula:

in the presence of a free radical initiator followed by saponifying an alcoholic solution of the resulting copolymer with an alkali or acid catalyst, so that the vinyl ester units in the copolymer are partially or completely saponified to vinyl alcohol units. In formula (a), $R^1$ is H or lower alkyl; B is

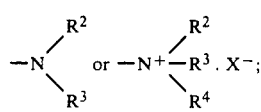

$R^2$, $R^3$ and $R^4$ are each independently lower alkyl which may contain further substituents; X is an anion capable of forming a salt with the ammonium nitrogen; and A is a group which links the nitrogen atom in B to the amide nitrogen atom.

When B in formula (a) is

the copolymerization may be followed by treatment with a quaternizing agent in order to form

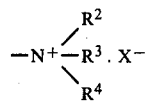

either before or after the saponification step.

According to an alternative method, the copolymers of the invention can also be produced by copolymerizing a vinyl ester and a polymerizable monomer represented by the formula:

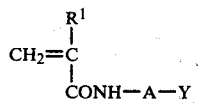

(b)

wherein $R^1$ is H or lower alkyl, Y is a halogen atom and A is a group which links Y to the amide nitrogen atom, saponifying the resulting copolymer by the action of an alkali or acid catalyst, so that the vinyl ester units in the copolymer are partially or completely saponified to vinyl alcohol units, and, before or after the saponification, reacting the copolymer with a dialkylamine or trialkylamine. However, when compared with this alternative method, the former method using monomer (a) is more advantageous from a commercial viewpoint and therefore will be described hereinbelow in more detail.

The vinyl ester usable in producing the copolymers of the invention are, for example, vinyl acetate, vinyl propionate and vinyl formate. Vinyl acetate is preferred from the standpoint of economics.

The amino group-containing cationic polymerizable monomer used in practicing the invention is represented by the above general formula (a). In formula (a), $R^1$ is H or lower alkyl and generally H and methyl are preferred. Most preferably, $R^1$ is H, when the rate of copolymerization is higher. B is a tertiary amino group

or a quaternary ammonium salt group

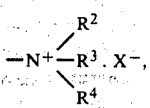

wherein $R^2$, $R^3$ and $R^4$ are each lower alkyl which may contain a further substituent and X is an anion group capable of forming a salt with the ammonium nitrogen atom. For general purposes, $R^2$, $R^3$ and $R^4$ are preferably methyl. For special purposes, however, such lower alkyls as ethyl and propyl, and further, lower alkyl groups containing such a substituent as methylol (for providing reactivity) or aminoalkyl (for increasing the cationic group density) may be used. X is preferably a halogen atom such as Cl, Br or I, $CH_3OSO_3$ or $CH_3C_6H_4SO_3$. From the viewpoints of economy, safety and physical properties of the copolymer, Cl (chlorine atom) is most preferred. It is most preferred that the amino group take the form of a quaternary ammonium salt, because such form can show cationic properties independently of the hydrogen ion concentration of the system. In some cases, however, it is necessary to use the polymerizable monomer in the form of a tertiary amine, where B is

When a monomer in the form of a tertiary amine is used, the copolymer may be quaternized in an alcoholic solution with a quaternizing agent such as an alkyl halide, dimethyl sulfate or methyl p-toluenesulfonate. In particular, 100% quaternization can be attained by bubbling gaseous methyl chloride through the solution. After quaternization the alcoholic solution of the copolymer can be submitted to saponification as described below. Alternatively, when a tertiary amine monomer is used, the saponification can be carried out without prior quaternization. In this case, the copolymer can be quaternized after saponification in an aqueous solution with a quaternizing agent such as mentioned above, especially methyl chloride. When a tertiary amine monomer is used, the amine may be in the form of a salt of an inorganic or organic acid such as hydrochloric, sulfuric or acetic acid. Also included within the scope of this invention are those copolymers produced by copolymerization of a tertiary amine monomer followed by saponification, without quaternization.

The group A which links the amino nitrogen atom in B to the amide nitrogen atom may be any group which has stable bonds. Suitable groups include divalent organic groups and divalent hydrocarbon groups. Preferably, A is a linear or branched aliphatic or araliphatic group. Linear aliphatic groups may be represented by the formula $-(CH_2)_n-$. In the groups of the present invention, the integer n is preferably 2 to 6.

Those monomers in which A is an aliphatic group having side chains or aryl groups are represented in brackets in the following formula:

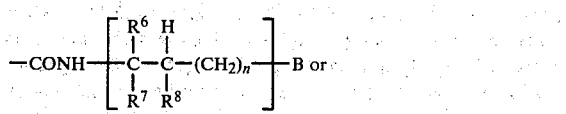

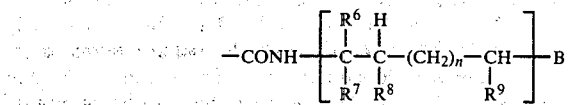

wherein $R^6$, $R^7$ and $R^9$ are each aryl or alkyl of not more than 10 carbon atoms, $R^8$ is H or alkyl of not more than 10 carbon atoms and n is an integer of 0 to 2, inclusive. These groups are preferred because their synthesis is economically advantageous and because their amide bonds are especially stable. Typical examples of monomers which meet the above structural requirements and are useful in the invention include:

N-(1,1-dimethyl-3-dimethylaminopropyl)acrylamide

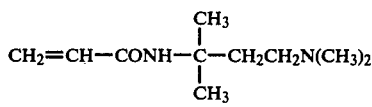

trimethyl-(3-acrylamido-3,3-dimethylpropyl)ammonium chloride

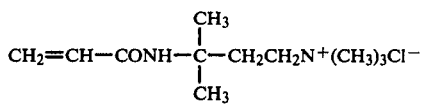

The above two monomers are especially preferred, since they can be produced commercially at relatively low costs, the rates of their copolymerization with a vinyl ester, especially vinyl acetate, are high, the synthesis of copolymers having high degrees of polymerization is possible and the amide bonding is extremely stable. While these monomers are known from German Pat. No. 2,254,905 and U.S. Pat. Nos. 3,666,810; 3,883,491; 3,917,594 and 3,943,114 and are shown to be copolymerizable with a numbe t of monomers including vinyl esters such as vinyl acetate, there is no teaching of copolymers resulting from saponification of the ester groups. It has not heretofore been known that such saponified copolymers with excellent industrially important properties as herein disclosed could be obtained.

Other examples of monomers usable in practicing the present invention are as follows:

N-(1,1-dimethyl-3-dimethylaminobutyl)acrylamide

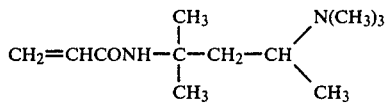

trimethyl-(3-acrylamido-3,3-dimethylbutyl)ammonium chloride

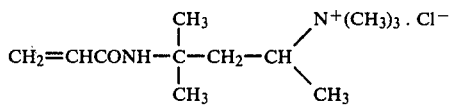

N-(1-methyl-1,3-diphenyl-3-diethylaminopropyl)methacrylamide

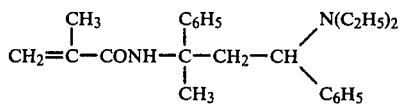

N-(3-dimethylaminopropyl)acrylamide

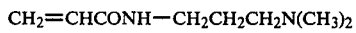

trimethyl-(3-acrylamidopropyl)ammonium chloride

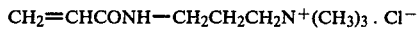

N,N,N',N'-pentamethyl-N'-(3-acrylamidopropyl)-2-butene-1,4-diammonium chloride

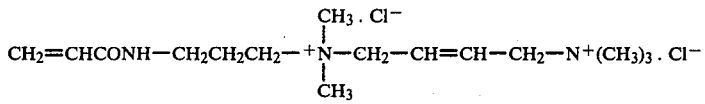

Compounds with general formula (a) where $R^1$ is methyl and A is $-(CH_2)_n-$ are represented by the formula:

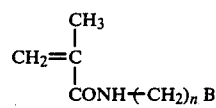

where B is

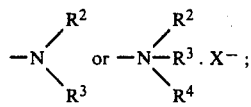

$R^2$, $R^3$ and $R^4$ are each lower alkyl which may contain a substituent; and X is an anion capable of forming a salt with the ammonium nitrogen. Suitable examples of such compounds include N-(2-dimethylaminoethyl)methacrylamide, N-(3-dimethylaminopropyl)methacrylamide, N-(3-diethylaminopropyl)methacrylamide, N-(4-dimethylaminobutyl)methacrylamide, N-(5-diethylaminohexyl) methacrylamide, N-(6-dimethylaminoheptyl)methacrylamide, and monomers derived therefrom by quaternization with such quaternizing agents as alkyl halides, especially methyl chloride or ethyl chloride, dimethyl sulfate or methyl p-toluenesulfonate. Preferred among these are N-(3-dimethylaminopropyl)methacrylamide and its quaternization product with methyl chloride, i.e., trimethyl-(3-methacrylamidopropyl)ammonium chloride.

The copolymerization of the above-mentioned cationic groupcontaining polymerizable monomer and the vinyl ester can be carried out by bulk, solution, suspension or emulsion polymerization techniques. Generally, however, solution polymerization using a lower alcohol, preferably methanol, as a solvent is preferred. The bulk and solution polymerization processes can be conducted either batchwise or continuously, while the suspension and emulsion polymerization processes are generally conducted batchwise. In batch processes, it is well known that the monomer composition varies with the conversion depending upon the monomer reactivity ratios ($r_1$, $r_2$). In order to obtain polymers having homogeneous comonomer compositions, therefore, it is desirable to add one or both of the monomers such that the monomer composition is maintained constant. In this socalled "semi-batch" process, the formula proposed by R. J. Hanna in Industrial and Engineering Chemistry 49 (2), 208–209 (1957) can be used in calculating the amounts of monomers to be added. Similarly, in the case of continuous copolymerization in a plurality of columns, it is desirable to add one or more of the monomers to the second and subsequent columns so that the monomer composition in each column remains constant.

Suitable examples of radical polymerization initiators which may be used include 2,2'-azobisisobutyronitrile, benzoyl peroxide and acetyl peroxide. The polymerization temperature is generally selected within the range of from 50° C. to the boiling point of the system.

The conversion of each monomer is selected by considering factors such as economy, polymerization degree, as well as other factors. The amount of the cationic monomer in the copolymer is not critical but may be selected in a suitable manner depending upon the intended use thereof, so that the copolymer may have any desired composition. The degree of polymerization of the copolymer can be adjusted in solution polymerization by controlling the amount of the solvent, especially methanol. No limitations are placed upon the degree of polymerization. The copolymers covered by the invention may have any degree of polymerization.

If part of the vinyl ester remains unreacted in the reaction mixture after completion of the copolymerization, it should be removed by any suitable means, such as by distillation. The residual cationic monomer need not always be removed, since in many cases, it does not interfere with subsequent treatments.

The vinyl ester units of the copolymer prepared in this manner are then saponified. The saponification may advantageously be conducted in an alcoholic solution, preferably in a methanolic solution. The alcohol may either by absolute or contain a small amount of water or an appropriate amount of an organic solvent such as methyl acetate or ethyl acetate.

As the catalyst for saponification, alkaline catalysts such as an alkali metal hydroxide, e.g., sodium hydroxide, potassium hydroxide, an alcoholate, e.g., sodium methylate, potassium methylate or ammonia; or acid catalysts such as hydrochloric or sulfuric acid may be used. Sodium hydroxide is preferred for economic reasons.

Generally, the saponification temperature is within the range of 10° to 50° C. It is undesirable to maintain the copolymer at higher temperatures under strongly alkaline or acidic conditions due to the possible decomposition of the amide linkages. Generally, however, such severe reaction conditions are not required since the saponification can be conveniently carried out under conditions at which the amide linkages are stable.

The saponification converts the vinyl ester units either partly or completely to vinyl alcohol units. The degree of conversion that is the degree of saponification, can have any suitable value depending on the use of the copolymer of the invention. The saponification degree preferably amounts to 65 to 100 mole %.

When the cationic monomer content in the copolymer amounts to less than about 10 mole %, a white gel or precipitate forms as the saponification in the alcoholic medium proceeds. The gel or precipitate may be ground, washed and dried, giving a white polymer in powder form. When the cationic monomer content in the copolymer is about 10 mole % or more, or when said content is less than about 10 mole % but the degree of saponification attained is relatively low, the product sometimes does not precipitate. In these cases, an organic solvent such as methyl acetate may be added to cause precipitation of the copolymer. Generally, the copolymer of the invention can, like PVA, be stored and transported in the form of a powder. Prior to use, the powder is dispersed in water and warmed with stirring, giving a sizing composition.

As mentioned previously, suitable proportions of the constituents of the copolymer can be selected in an arbitrary manner depending upon the particular use and there are no particular limitations thereon. However, when the copolymer is used as a paper strength additive, in accordance with one embodiment of the present invention, the cationic monomer content is preferably selected from within the range of 0.01 to 20 mole %, especially from 0.05 to 5 mole %. When the content is less than 0.01 mole %, the ability of the cationic composition to make the copolymer adsorbable on the pulp is inadequate. When the content is more than 20 mole %, on the other hand, a decrease in this ability is observed.

For use as a strength additive for paper, copolymers with superior physical properties are obtained when the degree of saponification is in the range of 70 to 100 mole %, particularly in the range of 85 to 100 mole %. At contents of less than 70 mole %, the ability of the copolymers to impart strength to paper is remarkably decreased. Generally, copolymers useful as strength additives have Brookfield viscosity values of not less than 5 centipoises, preferably not less than 20 centipoises, when measured at 20° C. with 4% aqueous solutions.

The copolymers of the present invention, particularly the copolymers having the above compositions useful as paper strength additives, are readily distinguishable from other PVA by their uncomparably superior adsorbability on paper pulp. While conventional PVA is essentially unadsorbable on pulp slurry, generally, about 80 to 100% of the paper strength additives of the present invention are adsorbed when added to pulp slurry to the extent of 1% based on dry pulp. Even under unfavorable conditions, the adsorption rate is not less than 50%. Owing to this distinctive property, the copolymers can be used as an internal strength additive for paper.

The characteristic features of the additives are as follows:

1. Highly effective in increasing dry strength of paper.
2. Provide excellent freeness.
3. Improve the coefficient of utilization of pigments.
4. Decrease the amount of waste sludge.
5. Make neutral paper-making possible.

When compared with the conventional paper strength additives of the starch and polyacrylamide types, the paper strength additives of the invention are superior in performance. This is presumably due to the fact that the main skeletal structure is that of PVA, which increases the strength of paper.

The copolymers of the present invention can be added to pulp by the so-called "beater addition" technique. According to this technique, the copolymers are added to an aqueous dispersion of pulp and become adsorbed on the pulp fibers. The pulp is then subjected to papermaking followed by drying in a conventional manner. The copolymers may also be applied by spraying or by saturation coating by means of a size press. The level of addition in the beater-site addition method depends upon the kind of paper being made and its intended use. Generally, the copolymers are added at levels within the range of 0.05 to 5% by weight based on dried pulp. The level of addition is preferably within the range of 0.1 to 2%.

The novel copolymers of the present invention may find uses other than as paper strength additives, particularly where the combined properties of PVA and the cationic functions can be utilized in an effective manner. Thus, for example, they may be useful as sizing compositions in warp sizing, antistatic agents for fibers, surface sizing compositions for paper, electroconductive agents for electrostatic recording paper, electrophotographic paper and the like, pigment retention aids and drainage aids in papermaking, sizing agents, size retention aids, binders for pigment coating, macromolecular flocculants, dehydrating agents, decoloring agents for colored waste water, ion exchanging resins, modifiers for amino resin adhesives, emulsifiers in emulsion polymerization, wall materials in microencapsulation, pastes for domestic use, binders for fibrous inorganic materials such as glass fiber and rock wool, constituents of cosmetics such as hair spray and setting lotion, auxiliaries for plating baths, anticorrosives, antibacterials, antifungal agents, anticlouding agents, moldings such as film, adhesives and so forth.

Having generally described this invention, a more complete understanding can be obtained by reference to certain specific examples, which are provided herein for purposes of illustration only and are not intended to be limiting unless otherwise specified.

EXAMPLES

The following examples will further illustrate the present invention. Unless otherwise stated, "part(s)" and "%" are on the basis of weight.

EXAMPLE 1

A one-liter flask equipped with stirrer, thermometer, dropping funnel and reflux condenser was charged with 500 g of vinyl acetate, 75 g of methanol and 3 g of N-(3-dimethylaminopropyl)acrylamide. The flask was placed in a thermostat, the system was purged with nitrogen with stirring, and then the internal temperature was raised to 60° C.

The polymerization was initiated by adding to this system 0.125 g of 2,2'-azobisisobutyronitrile together with 50 g of methanol. 20 g of a 25% solution of N-(3-dimethylaminopropyl)acrylamide in methanol was added dropwise at a constant rate over the polymerization period of 2 hours and 10 minutes. When the polymerization was terminated, the solid matter concentration in the system was 9.9%. A gas inlet tube and a vacuum distillation apparatus were connected to the flask, and methanol vapor was blown into the reaction mixture under reduced pressure so as to drive out the unreacted vinyl acetate monomer. There was obtained a 31% solution of a copolymer in methanol. It was revealed by nuclear magnetic resonance analysis that the copolymer contained 5.0 mole % of N-(3-dimethylaminopropyl)acrylamide units and 95.0 mole % of vinyl acetate units. To 80 g of the methanol solution of the copolymer, there was added with stirring at 40° C. 5.8 ml of 1 N methanolic sodium hydroxide solution. The resulting mixture was stirred well and then allowed to stand. Eight (8) minutes and 30 seconds later, the whole system turned into a gel. After 20 further minutes, the gel was ground in a mill, washed with methanol and dried to give a white powder of the polymer. The copolymer was very soluble in water and the Brookfield viscosity of a 4% aqueous solution thereof as measured at 20° C. was 38 centipoises. A proton nuclear magnetic resonance spectrum for a heavy water solution of this copolymer is shown in FIG. 1. The absorption peak at 2.79 ppm was assigned to the protons of the two methyl groups bound to the amino nitrogen atom in each N-(3-dimethylaminopropyl)-acrylamide unit and the N-(3-dimethylaminopropyl)acrylamide unit content was calculated to be 5.0 mole % based on the intensity of the absorption peak. The degree of saponification of the vinyl acetate units was estimated at 99.9 mole %. This means that the copolymer obtained was substantially a copolymer of N-(3-dimethylaminopropyl)-acrylamide and vinyl alcohol.

EXAMPLE 2

Figure 2:
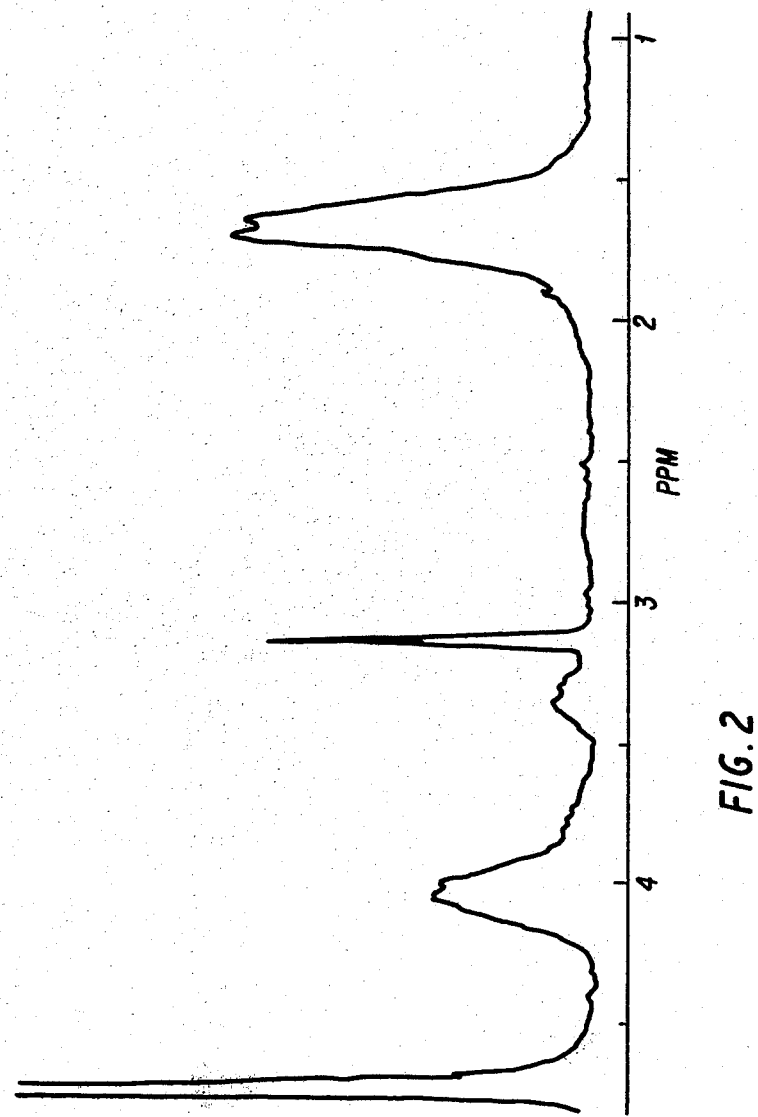

A flask equipped with stirrer, gas inlet tube and reflux condenser was charged with 80 g of a 31% solution in methanol of the N-(3-dimethylaminopropyl)acrylamide-vinyl acetate copolymer as prepared in Example 1. Gaseous methyl chloride was bubbled through the contents with stirring for 3 hours. Then, 5.8 ml of 1 N methanolic sodium hydroxide solution was added with stirring at 40° C. The mixture was stirred well and then allowed to stand. Six (6) minutes later, the whole system turned to gel. After allowing to stand for 20 minutes, the gel was ground, washed with methanol and dried. The white copolymer powder so obtained was very soluble in water, and the Brookfield viscosity at 20° C. of a 4% aqueous solution thereof was 35 centipoises. A proton nuclear magnetic resonance spectrum for the copolymer obtained as shown in FIG. 2. There was no longer the absorption at 2.79 ppm. Instead, there was an absorption at 3.13 ppm, which was assignable to the protons of the three methyl groups bound to the quaternary nitrogen atom. Therefore, the amino groups of the N-(3-dimethylaminopropyl)acrylamide units had all been quaternized to trimethyl-(3-acrylamidopropyl)ammonium chloride units, the content thereof being estimated at 5.0 mole % based on the absorption intensity at 3.13 ppm. The degree of saponification of the vinyl acetate units was estimated at 99.0 mole %.

EXAMPLE 3

Figure 3:
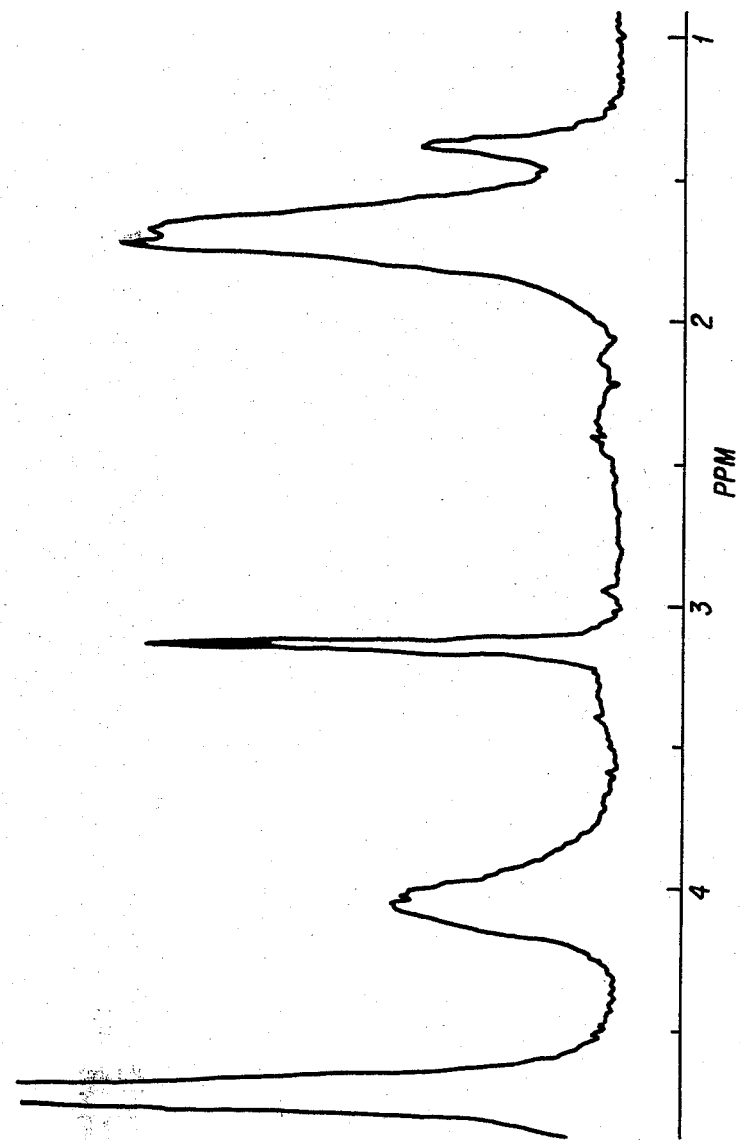

A 5-liter flask equipped with stirrer, thermometer, dropping funnel and reflux condenser was charged with 2,500 g of vinyl acetate, 697 g of methanol and 4.8 g of a white powder of trimethyl-(3-acrylamido-3,3-dimethylpropyl)ammonium chloride. The flask was placed in a thermostat, the system was purged with nitrogen with stirring, and, after the internal temperature was raised to 60° C., the polymerization was initiated by adding 3.5 g of 2,2'-azobisisobutyronitrile together with 50 g of methanol. Over the polymerization period of 3 hours, there was added dropwise at a constant rate of 362 g of a 50% methanol solution of trimethyl-(3-acrylamido-3,3-dimethylpropyl)ammonium chloride. When the polymerization was terminated, the solid content in the system was 49.8%. The flask was fitted with a gas inlet tube and a vacuum distillation apparatus and methanol vapor was blown into the reaction mixture under reduced pressure to expel the unreacted vinyl acetate monomer. There was obtained a 44.3% solution of a copolymer in methanol. Nuclear magnetic resonance analysis revealed that the copolymer comprised 4.0 mole % of trimethyl-(3-acrylamido-3,3-dimethylpropyl) ammonium chloride units and 96.0 mole % of vinyl acetate units. To 812 g of the methanol solution of the copolymer, there was added with stirring at 35° C. 42.1 ml of 2 M methanolic sodium hydroxide solution. The resulting mixture was stirred well and then allowed to stand. After 7 minutes and 20 seconds, the whole system turned into a gel. After 20 further minutes, the gel was ground in a mill, washed with methanol and dried with heating, to give a white powder of a polymer. A proton nuclear magnetic resonance spectrum for the so-obtained polymer as measured in a heavy water solution as shown in FIG. 3. The absorption peak at 3.13 ppm was assigned to the protons of the three methyl groups bound to the quaternary nitrogen atom in each trimethyl-(3-acrylamido-3,3-dimethylpropyl)-ammonium chloride unit and, based on the absorption intensity, the trimethyl-(3-acrylamido-3,3-dimethylpropyl)ammonium chloride unit content was estimated at 4.0 mole %. On the other hand, the degree of saponification of the vinyl acetate units was 99.3 mole %. The nitrogen content as determined by the Kjeldahl method was 2.17% by weight, which corresponded to a trimethyl-(3-acrylamido-3,3-dimethylpropyl)ammonium chloride content of 4.0 mole %. This was in good agreement with the result of the nuclear magnetic resonance analysis. The Brookfield viscosity at 20° C. of a 4% aqueous solution of the copolymer was 34.1 centipoises.

EXAMPLE 4

To 700 g of the methanol solution obtained in Example 3 after the removal of the remaining vinyl acetate monomer after the copolymerization, there was added 154 g of methyl acetate and 150 g of methanol. After stirring for homogenization, 15.7 ml of a 2 N methanolic sodium hydroxide solution was added with stirring at 40° C. The mixture was stirred well and then allowed to stand. After 14 minutes and 50 seconds, the whole system turned into a gel. After 20 further minutes of standing, the gel was ground in a mill, washed with methanol and dried to give a white polymeric powder. The so-obtained polymer was a copolymer with a trimethyl-(3-acrylamido-3,3-dimethylpropyl)ammonium chloride unit content of 4.0 mole % and a degree of saponification of the vinyl acetate units of 88.0 mole %. Its 4% aqueous solution had a Brookfield viscosity of 30.4 centipoises as measured at 20° C.

EXAMPLE 5

The same reaction apparatus as was used in Example 3 was charged with 3,000 g of vinyl acetate, 108 g of methanol and 1.1 g of trimethyl-(3-acrylamido-3,3-dimethylpropyl)ammonium chloride, and the copolymerization was initiated by adding 0.15 g of 2,2'-azobisisobutyronitrile and 50 g of methanol. Over the polymerization period of 1.0 hour, 20 g of a 50% methanolic solution of trimethyl(3-acrylamido-3,3-dimethylpropyl)ammonium chloride was added dropwise at a constant rate. When the polymerization was terminated, the solid matter content in the system was 15.7%. The remaining vinyl acetate monomer was removed by the procedures of Example 3, and there was obtained a methanolic copolymer solution containing 31.7% solid material. To 960 g of this methanolic solution, there was added with stirring at 40° C. 39.2 ml of 2 N methanolic sodium hydroxide solution. The mixture was stirred well and then allowed to stand. After 5 minutes and 35 seconds, the whole system turned into a gel. After 20 further minutes, the gel was ground in a mill, washed with methanol and dried with heating, to give a white copolymer powder. The nitrogen content of this copolymer was 0.492% by weight, corresponding to a trimethyl-(3-acrylamido-3,3-dimethylpropyl)ammonium chloride unit content of 0.8 mole %. The degree of saponification of vinyl acetate units was 99.4 mole % and the Brookfield viscosity at 20° C. of a 4% aqueous solution was 167 centipoises.

EXAMPLE 6

The same apparatus as was used in Example 3 was charged with 3,000 g of vinyl acetate, 283 g of methanol and 0.5 g of N-(1,1-dimethyl-3-dimethylaminopropyl)acrylamide hydrochloride, and the copolymerization was initiated by adding 0.3 g of 2,2'-azobisisobutyronitrile and 50 g of methanol. Over the polymerization period of 2.5 hours, there was added dropwise at a constant rate, 41 g of a 25% methanolic solution of N-(1,1-dimethyl-3-dimethylaminopropyl)-acrylamide hydrochloride. When the polymerization was terminated, the solid content in the system was 30.3%. The remaining vinyl acetate monomer was removed by the procedure of Example 3, and there was obtained a methanolic copolymer solution with a solid matter content of 33.0%. To 1,061 g of this methanolic solution was added with stirring at 40° C. 51 ml of 2 N methanolic sodium hydroxide solution. The mixture was stirred well and then allowed to stand. After 2 minutes and 15 seconds, the whole system turned into a gel. After 20 minutes of standing, the gel was ground in a mill, washed with methanol and dried with heating, to give a white copolymer powder. It was calculated from the nitrogen content of this copolymer that the N-(1,1-dimethyl-3-dimethylaminopropyl)acrylamide unit content was 0.4 mole %. The degree of saponification of vinyl acetate units was 99.7 mole % and the Brookfield viscosity at 20° C. of a 4% aqueous solution of the copolymer was 71.2 centipoises.

EXAMPLE 7

Gaseous methyl chloride was bubbled through 1,000 g of a 5% aqueous solution of the N-(1,1-dimethyl-3-dimethylaminopropyl)-acrylamide-vinyl alcohol-vinyl acetate copolymer prepared in Example 6, in a 2-liter flask with stirring. After 5 hours of bubbling, the copolymer in the aqueous solution was analyzed by proton nuclear magnetic resonance and it was found that all the amino groups had been quaternized and that the copolymer had a trimethyl-(3-acrylamido)-3,3-dimethylpropyl)ammonium chloride content of 0.4 mole %.

EXAMPLE 8

A reaction vessel equipped with stirrer, thermometer, dropping funnel and reflux condenser was charged with 500 parts of vinyl acetate, 75 parts of methanol and 3.9 parts of N-(3-dimethylaminopropyl)methacrylamide together with a sufficient amount of acetic acid to neutralize the amide. The reaction vessel was placed in a thermostat, the reaction system was purged with nitrogen with stirring, and the internal temperature was raised to 60° C.

Figure 4:
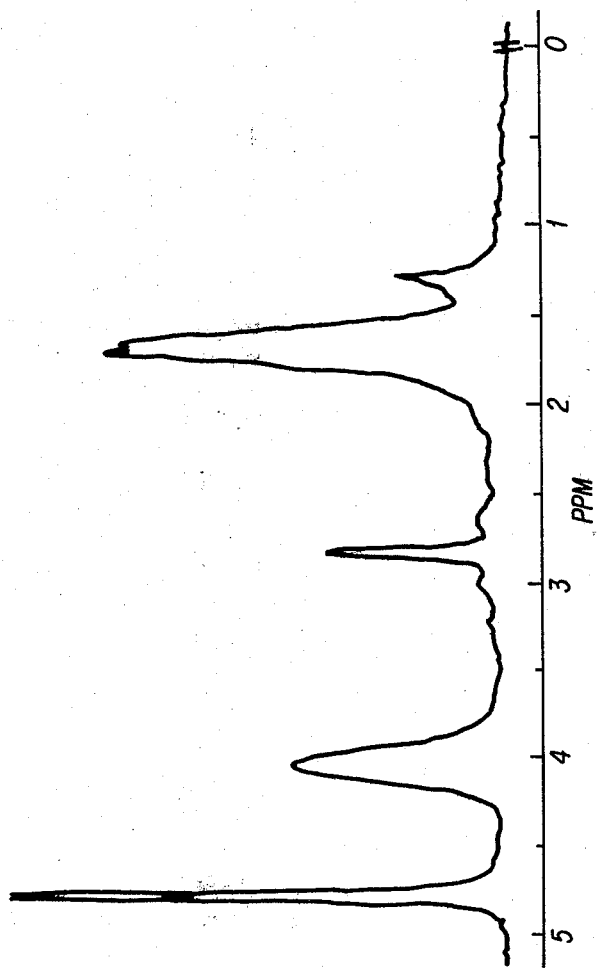

To this system was added 1.8 parts of 2,2'-azobisisobutyronitrile together with 50 parts of methanol to initiate the polymerization. A methanolic solution (57 parts) containing 14 parts of N-(3-dimethylaminopropyl)methacrylamide and a sufficient amount of acetic acid to neutralize the same was added dropwise over the polymerization period of 5 hours and 20 minutes depending on the solid content in the system. When the polymerization was terminated, the solid content in the system was 28%. Methanol vapor was blown into the reaction mixture under reduced pressure so as to expel the unreacted vinyl acetate monomer. A 45% methanolic solution of a copolymer was obtained. Nuclear magnetic resonance analysis revealed that the N-(3-dimethylaminopropyl)methacrylamide unit content of this copolymer was 4.3 mole % and the vinyl acetate unit content was 95.7 mole %. To 111 parts of the methanolic solution of the copolymer was added with stirring at 40° C. 9.3 parts of 1 N methanolic sodium hydroxide solution. The mixture was stirred well and then allowed to stand. After 5 minutes and 30 seconds, the whole system turned into a gel. After 20 further minutes, the gel was ground in a mill, washed with methanol and dried, to give a white polymer powder. The copolymer was very soluble in water, and the Brookfield viscosity at 20° C. of a 4% aqueous solution of the copolymer was 36.4 centipoises. A proton nuclear magnetic reasonance spectrum for a heavy water solution of this copolymer is shown in FIG. 4. The absorption peak at 2.79 ppm was assigned to the protons of the two methyl groups bound to the amino nitrogen atom in each N-(3-dimethylaminopropyl)methacrylamide unit, and the N-(3-dimethylaminopropyl)methacrylamide unit content was estimated at 4.3 mole % on the basis of the absorption intensity of the peak. The degree of saponification of the vinyl acetate units was found to be 99.9 mole %. Thus, the copolymer obtained was substantially an N-(3-dimethylaminopropyl)methacrylamidevinyl alcohol copolymer.

EXAMPLE 9

A reaction vessel equipped with stirrer, gas inlet tube and reflux condenser was charged with 111 parts of the methanolic solution (45%) of the N-(3-dimethylaminopropyl)methacrylamide-vinyl acetate copolymer prepared in Example 8. Gaseous methyl chloride was bubbled therethrough with stirring for 3 hours. Then, 8.4 parts of 1 N methanolic sodium hydroxide solution was added with stirring. The resulting mixture was stirred well and then allowed to stand. In 6 minutes, the whole system turned into a gel. After 20 minutes of standing, the gel was ground in a mill, washed with methanol and dried, to give a white copolymer powder. This powder was very soluble in water, and the Brookfield viscosity at 20° C. of a 4% aqueous solution thereof was 35 centipoises. Nuclear magnetic resonance spectrometry revealed that all the amino groups in the N-(3-dimethylaminopropyl)methacrylamide units in the copolymer had been quaternized to trimethyl-(3-methacrylamidopropyl)ammonium chloride units, the content of which was estimated at 4.3 mole % based on the absorption intensity of the peak at 3.13 ppm. The degree of saponification of vinyl acetate units was 99.0 mole %.

EXAMPLE 10

Figure 5:
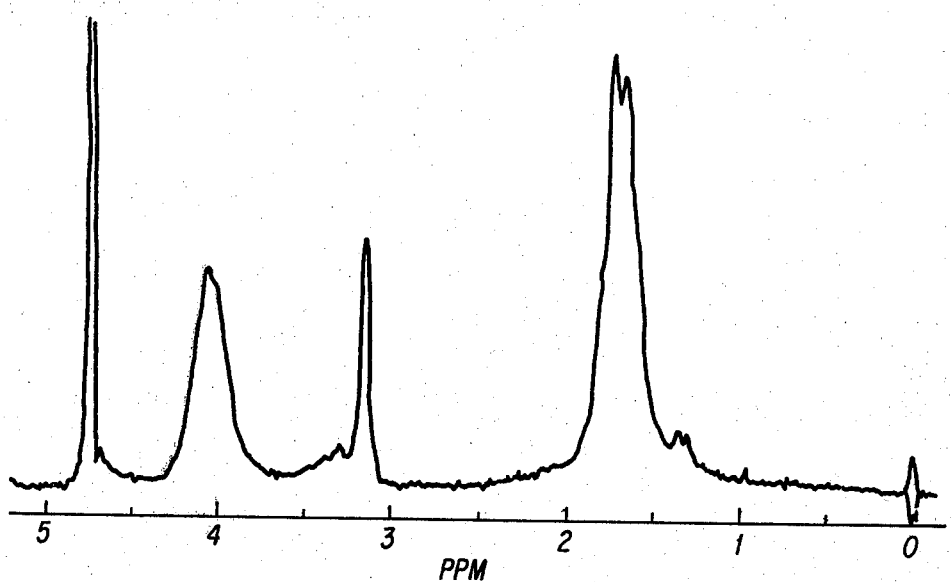

A reaction vessel equipped with stirrer, thermometer, dropping funnel and reflux condenser was charged with 2,500 parts of vinyl acetate, 697 parts of methanol and 15 parts of a white powder of trimethyl-(3-methacrylamidopropyl)ammonium chloride. The vessel was placed in a thermostat, the reaction system was purged with nitrogen with stirring, the internal temperature was raised to 60° C., and the polymerization was initiated by adding 4.5 parts of 2,2'-azobisisobutyronitrile together with 50 parts of methanol. Over the polymerization period of 3 hours, 185 parts of a 50% methanolic solution of trimethyl-(3-methacrylamidopropyl)ammonium chloride was added dropwise depending upon the solid matter concentration in the reaction system. When the polymerization was terminated, the solid content was 46%. A gas inlet tub and a vacuum distillation apparatus were connected to the flask, and methanol vapor was blown into the reaction mixture under reduced pressure so as to expel the unreacted vinyl acetate monomer. There was obtained a 45% methanolic solution of a copolymer. It was revealed by nuclear magnetic resonance analysis that the copolymer comprised 2.6 mole % of trimethyl(3-methacrylamidopropyl)ammonium chloride units and 97.4 mole % of vinyl acetate units. To 812 parts of the methanolic solution of this copolymer was added with stirring at 35° C. 34 parts of 2 N methanolic sodium hydroxide solution. The mixture was stirred well and then allowed to stand. In 6 minutes and 10 seconds, the whole system turned into a gel. After 20 further minutes, the gel was ground in a mill, washed with methanol and dried with heating, to give a white polymer powder. A proton nuclear magnetic resonance spectrum recorded with a heavy water solution of the polymer obtained is shown in FIG. 5. The absorption at 3.13 ppm was assigned to the protons of the three methyl groups bound to the quaternary nitrogen atom in each trimethyl-(3-methacrylamidopropyl)ammonium chloride unit, and the trimethyl-(3-methacrylamidopropyl)ammonium chloride unit content was estimated at 2.6 mole % based on the absorption intensity of the peak. The degree of saponification of vinyl acetate units was 99.3 mole %. The Brookfield viscosity at 20° C. of a 4% aqueous solution was 32.8 centipoises.

EXAMPLE 11

Figure 6:
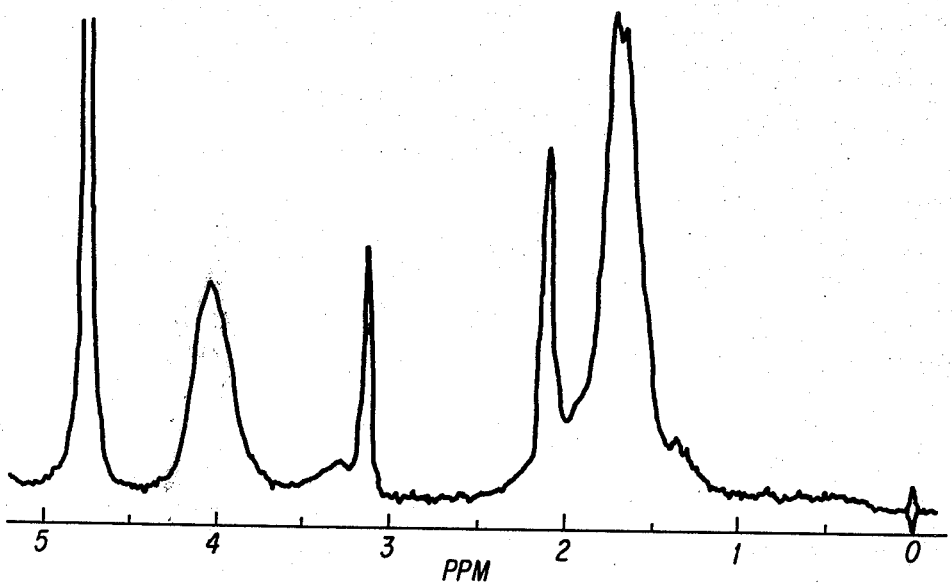

To 700 parts of the methanolic solution after removal of the remaining vinyl acetate monomer following the polymerization in Example 10, there were added 154 parts of methyl acetate and 150 parts of methanol. The mixture was stirred well for homogenization, then 13 parts of 2 N methanolic sodium hydroxide solution was added with stirring at 40° C., and the mixture was stirred well and then allowed to stand. In 10 minutes and 20 seconds, the whole reaction system turned into a gel. After 20 further minutes of standing, the gel was ground in a mill, washed with methanol and dried, to give a white polymer powder. A proton nuclear magnetic resonance spectrum for a heavy water solution of the so-obtained polymer is shown in FIG. 6. This polymer had a trimethyl-(3-methacrylamidopropyl)ammonium chloride unit content of 2.6 mole % and a degree of saponification of the vinyl acetate units of 88.0 mole %. A 4% aqueous solution had a Brookfield viscosity at 20° C.. of 29.5 centipoises.

EXAMPLE 12

The same reaction vessel as was used in Example 10 was charged with 3,000 parts of vinyl acetate, 108 parts of methanol and 5 parts of trimethyl-(3-methacrylamidopropyl)ammonium chloride, and the copolymerization was initiated by adding 0.45 part of 2,2'-azobisisobutyronitrile and 50 parts of methanol. Thereto was added dropwise at a constant rate over the polymerization period of 1 hour and 20 minutes 18 parts of a 50% methanolic solution of trimethyl-(3-methacrylamidopropyl)ammonium chloride. When the polymerization was terminated, the solid content in the system was 16.1%. The remaining vinyl acetate monomer was removed by the same procedure as in Example 10 and there was obtained a methanolic copolymer solution having a solid content of 32%. To 960 parts of this methanolic solution was added with stirring at 40° C. 31 parts of 2 methanolic sodium hydroxide solution. The mixture was stirred well and then allowed to stand. In 4 minutes and 55 seconds, the whole reaction system turned into a gel. After 20 further minutes, the gel was ground in a mill, washed with methanol and dried with heating, to give a white copolymer powder. The copolymer had a nitrogen content of 0.429%, which corresponded to a trimethyl-(3-methacrylamidopropyl)ammonium chloride unit content of 0.8 mole %. The degree of saponification of vinyl acetate units was 99.4 mole %, and the Brookfield viscosity at 20° C. of a 4% aqueous solution of the copolymer was 155 centipoises.

EXAMPLE 13

Aqueous solutions of the copolymers synthesized in Examples 2-7 and a control polymer were respectively added in amounts specified in Table 1 to a 1% aqueous slurry of pulp (NBKP) having a Canadian standard freeness of 565 ml. Three (3) minutes later, papers were fabricated by the TAPPI standard paper machine so that a basis weight of 80±5 g/m$^2$ was obtained. The papers were press-dewatered for 5 minutes under a pressure of 3.5 kg/cm$^2$, dried on a rotary drum drier at 110° C. for one minute, and conditioned at 20° C. and 65% RH (relative humidity) for 48 hours.

Separately, the white waters after the papermaking were sampled and concentrated and analyzed for the copolymer concentrations therein by an iodine color reaction mthod in accordance with J. H. Finley, Journal of Analytical Chemistry 33 (13), 1925 (1961), and the amounts of the respective copolymers that had been adsorbed on pulp were calculated.

Each paper specimen after the conditioning was tested for tensile strength (breaking length) according to JIS (Japanese Industrial Standard) 8113, and for JIS burst factor according to JIS-8112. The results are shown in Table 1. In Table 1, test results are also shown for a control paper where no paper strength additive was used and for control paper where a conventional PVA having no cationic groups (Kuraray's POVAL PVA-117, saponification degree 98.5%, polymerization degree 1750) was used. The control papers were otherwise prepared in the same manner.

While PVA-117 lacking cationic groups did not show any substantial adsorption and did not improve paper strength, the copolymers of the invention all showed high degrees of adsorption and excellent paper strength improving effects.

EXAMPLE 14

Aqueous solutions of the copolymers synthesized in Examples 8–12 and a control polymer were respectively added in amounts specified in Table 2 to a 1% aqueous slurry of pulp (1:1 mixture of LBKP and NBKP) having Canadian standard freeness of 582 ml. Three minutes (3) later, papers were prepared by the TAPPI standard paper machine so that a basis weight of 80±5 g/m$^2$ was obtained.

TABLE 1

| Polymer | Level of Addition of Polymer Based on Pulp (%) | Adsorption (%) | Breaking Length (Km) | JIS Burst Factor |
|---|---|---|---|---|
| THE PRESENT INVENTION: | | | | |
| Example 2 | 0.3 | 75 | 4.21 | 3.19 |
| Example 2 | 0.6 | 81 | 4.77 | 3.85 |
| Example 3 | 0.3 | 82 | 4.61 | 3.25 |
| Example 3 | 0.6 | 77 | 4.92 | 3.90 |
| Example 4 | 0.3 | 92 | 4.44 | 3.05 |
| Example 4 | 0.6 | 89 | 4.85 | 3.76 |
| Example 5 | 0.3 | 98 | 4.75 | 3.44 |
| Example 5 | 0.6 | 95 | 5.60 | 4.50 |
| Example 6 | 0.3 | 90 | 4.30 | 3.05 |
| Example 6 | 0.6 | 88 | 4.90 | 3.80 |
| Example 7 | 0.3 | 85 | 4.41 | 3.15 |
| Example 7 | 0.6 | 83 | 5.00 | 3.92 |
| FOR COMPARISON: | | | | |
| No Additive | — | — | 3.83 | 2.65 |
| PVA-117 | 0.3 | 0.5 | 3.84 | 2.52 |
| PVA-117 | 0.6 | 1.1 | 3.80 | 2.44 |

The papers were press-dewatered for 5 minutes under 3.5 kg/cm$^2$, dried on a rotary drum drier at 110° C. for one minute, and conditioned at 20° C. for 65% RH for 48 hours.

Separately, the white waters after the papermaking were sampled and concentrated, and analyzed for the copolymer concentrations therein by an iodine color reaction method in accordance with J. H. Finley, Journal of Analytical Chemistry 33 (13), 1925 (1961), and the amounts of the respective copolymers that had been adsorbed on pulp were calculated.

Each paper specimen after the conditioning was tested for tensile strength (breaking length) according to JIS-8113 and for JIS burst factor according to JIS-8112. The results are shown in Table 2. In Table 2, test results are also shown for a control case where no paper strength additive was used and for cases where a conventional PVA having no cationic groups (Kuraray's POVAL PVA-117, saponification degree 98.5%, polymerization degree 1750) was used. In the case for comparison, paper was prepared in the same manner.

Whereas PVA-117 lacking cationic groups failed to attain any substantial adsorption or improve paper strength to any substantial extent, the copolymers of the invention all achieved high degrees of adsorption and produced excellent paper strength improving effects.

EXAMPLE 15

For evaluating the freeness (or drainage rate) improving effect of the copolymers of the invention, aqueous solutions of the copolymers and an aqueous solution of PVA-117 for conparison were respectively added to the same pulp slurry was used in Example 14.

TABLE 2

| Polymer | Level of Addition of Polymer Based on Pulp (%) | Adsorption (%) | Breaking Length (Km) | JIS Burst Factor |
|---|---|---|---|---|
| THE PRESENT INVENTION: | | | | |
| Example 8 | 0.3 | 76 | 3.21 | 2.40 |
| Example 8 | 0.6 | 78 | 4.51 | 3.88 |
| Example 9 | 0.3 | 84 | 4.21 | 2.80 |
| Example 9 | 0.6 | 83 | 5.10 | 4.35 |
| Example 10 | 0.3 | 91 | 4.20 | 2.98 |
| Example 10 | 0.6 | 93 | 5.13 | 4.41 |
| Example 11 | 0.3 | 98 | 3.91 | 2.89 |
| Example 11 | 0.6 | 95 | 4.89 | 4.20 |
| Example 12 | 0.3 | 93 | 4.11 | 3.07 |
| Example 12 | 0.6 | 87 | 5.03 | 4.35 |
| FOR COMPARISON: | | | | |
| No Additive | — | — | 3.18 | 2.03 |
| PVA-117 | 0.3 | 0.5 | 3.05 | 1.95 |
| PVA-117 | 0.6 | 1 | 3.00 | 1.81 |

The polymer in each case amounted to 1% based on dry pulp. Using a so-prepared aqueous slurry having a pulp concentration of 3 g/l, the Canadian standard freeness was determined for each case. The results are shown in Table 3.

TABLE 3

| Polymer | Canadian Standard Freeness (ml) |
|---|---|
| THE PRESENT INVENTION: | |
| Example 8 | 621 |
| Example 9 | 635 |
| Example 10 | 740 |
| Example 11 | 715 |
| Example 12 | 620 |
| FOR COMPARISON: | |
| No Additive | 582 |
| PVA-117 | 568 |

When the copolymers of the invention were added, the Canadian standard freeness values were always high. The copolymers thus have excellent freeness improving effects.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A water-soluble cationic polymer which comprises comonomer units respectively represented by the formulae:

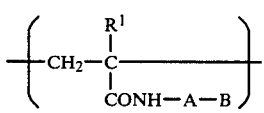
(I)

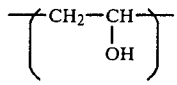
(II)

wherein $R^1$ is H or lower alkyl; B is

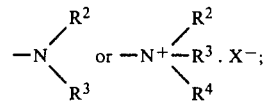

$R^2$, $R^3$ and $R^4$ are each independently lower alkyl or lower alkyl which contain a substituent; X is an anion capable of forming a salt with the ammonium nitrogen; and A is a divalent organic group which links the nitrogen atom in B to the amide nitrogen atom.

2. The copolymer of claim 1, wherein A in formula (I) is a linear or branched aliphatic group.

3. The copolymer of claim 1, wherein A in formula (I) is a group as shown in brackets in the formulae:

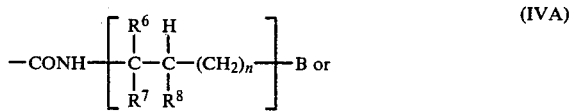
(IVA)

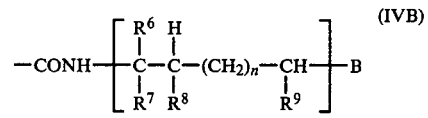
(IVB)

wherein $R^6$, $R^7$ and $R^9$ are each aryl or alkyl or not more than 10 carbon atoms, $R^8$ is H or alkyl of not more than 10 carbon atoms, and n is an integer of 0 to 2, inclusive.

4. The copolymer of claim 3, wherein $R^6$ and $R^7$ are each methyl, $R^8$ is H and n=1 in formula (IVA).

5. The copolymer of claim 4, wherein $R^1$ in formula (I) is H.

6. The copolymer of claim 5, wherein in formula (I), B is

(V)

($R^2$, $R^3$, $R^4$ and X being as defined in claim 1).

7. The copolymer of claim 6, wherein in formula (V), $R^2$, $R^3$ and $R^4$ are each methyl and X is Cl.

8. The copolymer of claim 1, wherein in formula (I), $R^1$ is methyl and A is a group represented by the formula—$(CH_2)_n$—wherein n is an integer of 2 to 6, inclusive.

9. A water-soluble cationic copolymer which comprises comonomer units respectively represented by the general formulae:

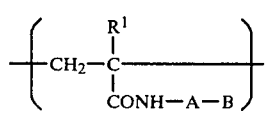
(I)

-continued

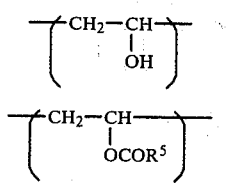

wherein $R^1$ is H or lower alkyl; B is

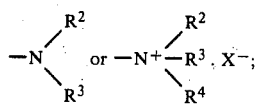

$R^2$, $R^3$ and $R^4$ are each independently lower alkyl or lower alkyl which contains a substituent; X is an anion capable of forming a salt with the ammonium nitrogen; $R^5$ is H or lower alkyl and A is a divalent organic group which links the nitrogen atom in B to the amide nitrogen atom.

10. The copolymer of claim 9, wherein A in formula (I) is a linear or branched aliphatic group.

11. The copolymer of claim 9, wherein A in formula (I) is a group as shown in brackets in the formulae:

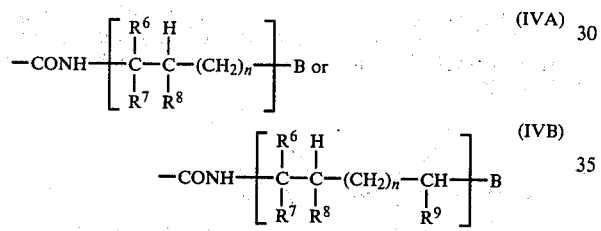

wherein $R^6$, $R^7$ and $R^9$ are each aryl or alkyl of not more than 10 carbon atoms, $R^8$ is H or alkyl of not more than 10 carbon atoms and n is an integer of 0 to 2, inclusive.

12. The copolymer of claim 11, wherein in the formula (IVA) $R^6$ and $R^7$ are each methyl, $R^8$ is H and n=1.

13. The copolymer of claim 12, wherein in formula (I), $R^1$ is H.

14. The copolymer of claim 13, wherein in formula (I), B is

($R^2$, $R^3$, $R^4$ and X being as defined in claim 9).

15. The copolymer of claim 14, wherein in formula (V), $R^2$, $R^3$ and $R^4$ are each methyl and X is Cl.

16. The copolymer of claim 9, wherein in formula (I), $R^1$ is methyl and A is a group represented by the formula —$(CH_2)_n$— wherein n is an integer of 2 to 6, inclusive.

17. The copolymer of claim 16, wherein $R^5$ in formula (III) is methyl.

18. A method of producing a water-soluble cationic copolymer which comprises copolymerizing a vinyl ester and a polymerizable monomer represented by the formula:

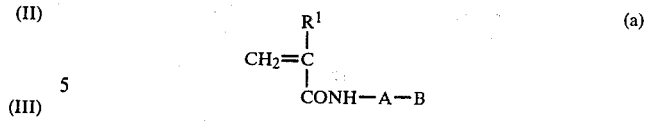

in the presence of a radical initiator; and treating an alcoholic solution of the copolymer with an alkali or acid catalyst, so that the vinyl ester units in the copolymer are at least partially saponified to vinyl alcohol units, wherein $R^1$ is H or lower alkyl; B is

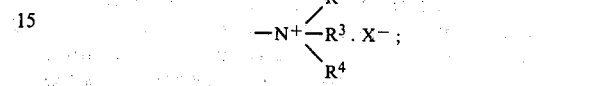

$R^2$, $R^3$ and $R^4$ are each independently lower alkyl or lower alkyl containing an additional substituent; X is an anion capable of forming a salt with the ammonium nitrogen; and A is a divalent organic group which links the nitrogen atom in B to the amide nitrogen atom.

19. The method of claim 18, wherein the vinyl ester is vinyl acetate.

20. The method of claim 18 or 19, wherein A in formula (a) is a linear or branched aliphatic group.

21. The method of claim 18 or 19, wherein A in formula (a) is a group as shown in brackets in the formulae:

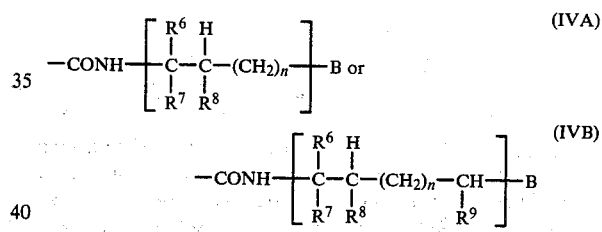

wherein $R^6$, $R^7$ and $R^9$ are each aryl or alkyl of not more than 10 carbon atoms, $R^8$ is H or alkyl of not more than 10 carbon atoms and n is an integer of 0 to 2, inclusive.

22. The method of claim 21, wherein in formula (IVA), $R^6$ and $R^7$ are each methyl, $R^8$ is H and n=1.

23. The method of claim 22, wherein in formula (a), $R^1$ is H.

24. The method of claim 23, wherein in formula (V), $R^2$, $R^3$ and $R^4$ are each methyl and X is Cl.

25. The method of claim 18 or 19, wherein in formula (a), $R^1$ is methyl and A is a group represented by the formula —$(CH_2)_n$—wherein n is an integer of 2 to 6, inclusive.

26. A method of producing a water-soluble cationic copolymer which comprises copolymerizing a vinyl ester and a polymerizable monomer represented by the formula:

in the presence of a radical initiator; and treating an alcoholic solution of the copolymer with an alkali or acid catalyst, so that the vinyl ester units in the copolymer are at least partially saponified to vinyl alcohol units, wherein $R^1$ is H or lower alkyl; B is

$R^2$ and $R^3$ are each independently lower alkyl or lower alkyl containing an additional substituent; X is an anion capable of forming a salt with the ammonium nitrogen; and A is a divalant organic group which links the nitrogen atom in B to the amide nitrogen atom; wherein the copolymer is quarternized in an alcoholic solution with a quaternizing agent prior to the saponification.

27. A method of producing a water-soluble cationic copolymer which comprises copolymerizing a vinyl ester and a polymerizable monomer represented by the formula:

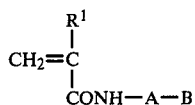  (a)

in the presence of a radical initiator; and treating an alcoholic solution of the copolymer with an alkali or acid catalyst, so that the vinyl ester units in the copolymer are at least partially saponified to vinyl alcohol units, wherein $R^1$ is H or lower alkyl; B is

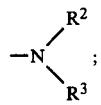

$R^2$ and $R^3$ are each independently lower alkyl or lower alkyl containing an additional substituent; X is an anion capable of forming a salt with the ammonium nitrogen; and A is a divalent organic group which links the nitrogen atom in B to the amide nitrogen atom; wherein the moiety of the copolymer which has not been quarternized after the copolymerization and before the saponification, is quaternized after the saponification in an aqueous solution with a quaternizing agent.

28. The method of claim 26, wherein the quaternizing agent is methyl chloride and wherein in formula (VI), $R^2$ and $R^3$ are each methyl.

29. The method of claim 27, wherein the quaternizing agent is methyl chloride and wherein in formula (VI), $R^2$ and $R^3$ are each methyl.

30. A paper strength additive consisting essentially of a water-soluble cationic copolymer which comprises comonomer units respectively represented by the formulae:

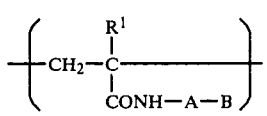  (I)

-continued

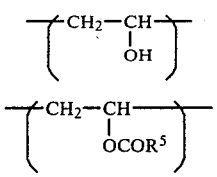

wherein $R^1$ is H or lower alkyl; B is

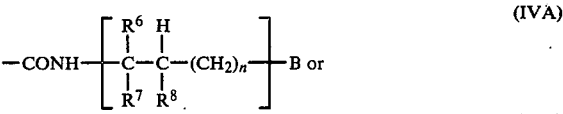

$R^2$, $R^3$, and $R^4$ are each independently lower alkyl or lower alkyl which contains a substituent; X is an anion capable of forming a salt with the ammonium nitrogen; $R^5$ is H or lower alkyl and A is a divalent organic group which links the nitrogen atom in B to the amide nitrogen atom; the proportion of (I) being 0.01 to 20 mole %, the proportion of (II) being 70 to 100 mole % based on the sum of (II) and (III), the proportion of (III) being 0 to 30 mole % based on the sum of (II) and (III); the Brookfield viscosity of a 4% aqueous solution of the copolymer as measured at 20° C. being not lower than 4 centipoises.

31. The paper strength additive of claim 30, wherein A in formula (I) is a linear or branched aliphatic group.

32. The paper strength additive of claim 30, wherein A in formula (I) is a group as shown in brackets in the formulae:

$$-CONH-\left[\begin{array}{cc} R^6 & H \\ | & | \\ C-C-(CH_2)_n \\ | & | \\ R^7 & R^8 \end{array}\right]-B \quad \text{or} \quad (IVA)$$

$$-CONH-\left[\begin{array}{cc} R^6 & H \\ | & | \\ C-C-(CH_2)_n \\ | & | \\ R^7 & R^8 \end{array}\right]-\begin{array}{c} CH \\ | \\ R^9 \end{array}-B \quad (IVB)$$

wherein $R^6$, $R^7$ and $R^9$ are each aryl or alkyl of not more than 10 carbon atoms, $R^8$ is H or alkyl of not more than 10 carbon atoms and n is an integer of 0 to 2, inclusive.

33. The paper strength additive of claim 32, wherein in formula (IVA), $R^6$ and $R^7$ are each methyl, $R^8$ is H and n=1.

34. The paper strength additive of claim 33, wherein in formula (I), $R^1$ is H.

35. The paper strength additive of claim 34, wherein in formula (I), B is

  (V)

($R^2$, $R^3$, $R^4$ and X being as defined in claim 31).

36. The paper strength additive of claim 35, wherein in formula (V), $R^2$, $R^3$ and $R^4$ are each methyl and X is Cl.

37. The paper strength additive of claim 30, wherein in formula (I), $R^1$ is methyl and A is a group represented by the formula $-(CH_2)_n-$; wherein n is an integer of 2 to 6, inclusive.

38. The paper strength additive of claim 37, wherein in formula (III), $R^5$ is methyl.

* * * * *